United States Patent [19]

Schoofs

[11] 4,267,408
[45] May 12, 1981

[54] ARRANGEMENT FOR APPLYING A SIGNAL TO A TRANSMISSION LINE

[75] Inventor: Franciscus A. C. M. Schoofs, Eindhoven, Netherlands

[73] Assignee: U.S. Philips Corporation, New York, N.Y.

[21] Appl. No.: 51,085

[22] Filed: Jun. 22, 1979

[30] Foreign Application Priority Data

Jul. 13, 1978 [NL] Netherlands .................. 7807531

[51] Int. Cl.³ .......................................... H04M 19/00
[52] U.S. Cl. ................................................... 179/77
[58] Field of Search .................. 179/77, 81 R, 81 A, 179/18 F, 18 FA, 84 R, 84 A, 16 R, 16 A, 16 AA

[56] References Cited

U.S. PATENT DOCUMENTS 4,087,647  5/1978  Embree et al. ...................... 179/77

FOREIGN PATENT DOCUMENTS 1290202  3/1969  Fed. Rep. of Germany ............ 179/77
2624021  12/1977  Fed. Rep. of Germany ............ 179/77
2254168  7/1975  France ................................ 179/77

Primary Examiner—Thomas A. Robinson
Attorney, Agent, or Firm—Thomas A. Briody; William J. Streeter; Laurence A. Wright

[57] ABSTRACT

An electronic circuit for applying a signal to a telephone line is disclosed wherein the signal to be transferred is superimposed on a direct current and applied to the reference voltage circuit of a bidirectional current source. The current source in turn applies, from high internal resistances, oppositely directed currents which are equal to each other and proportional to the signal onto the two wires of the telephone line.

4 Claims, 3 Drawing Figures

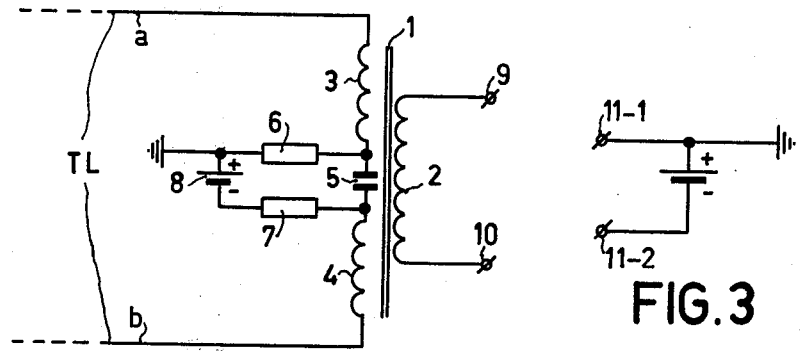
FIG.1 PRIOR ART
FIG.3
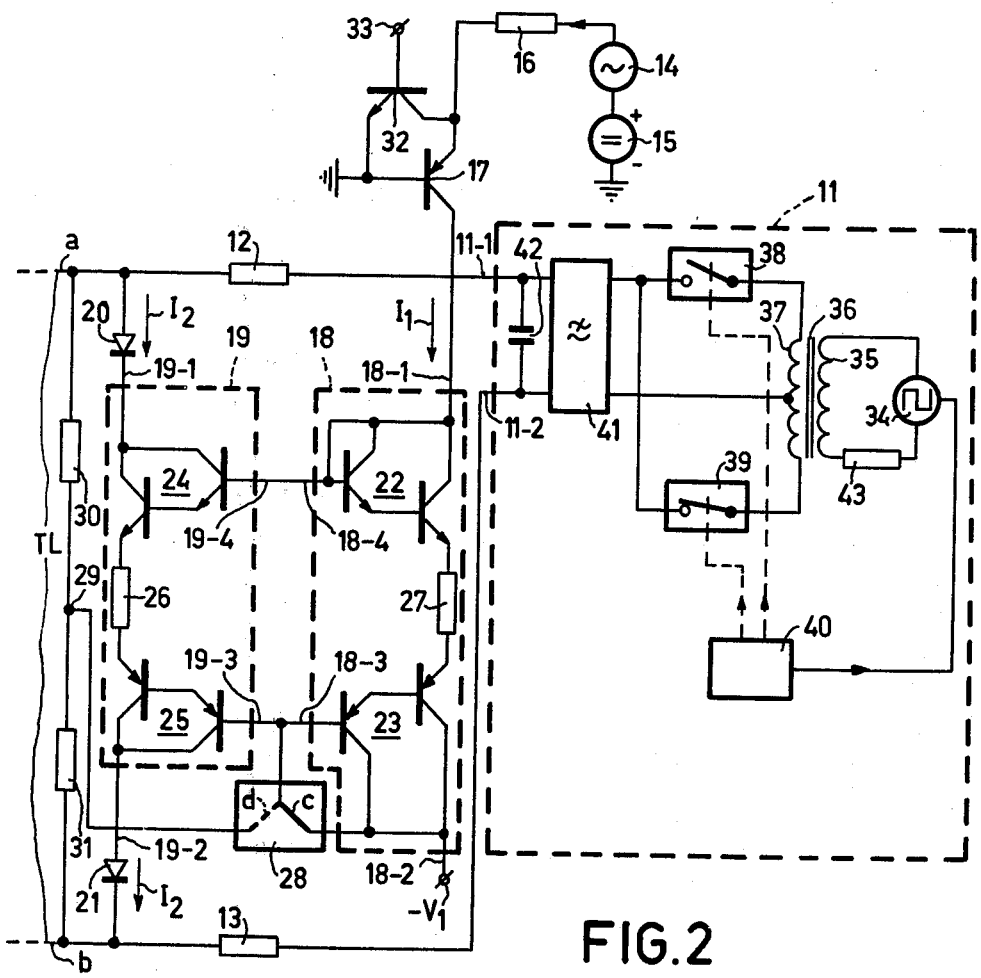
FIG.2

ARRANGEMENT FOR APPLYING A SIGNAL TO A TRANSMISSION LINE

BACKGROUND OF THE INVENTION (1) Field of the invention

The invention relates to an arrangement for applying a signal to a transmission line, in particular a telephone line which is symmetrically fed from a d.c. voltage source.

This field includes circuits for connecting telephone lines to automatic telephone exchanges, from where the telephone lines are fed with direct current and wherein speech signals are transferred from and to the telephone line.

(2) Description of the prior art

As shown in FIG. 1, a conventional, known connection circuit of this type comprises a transformer 1 having a primary winding 2 and a secondary winding which is divided into two portions 3 and 4. For alternating current, these two portions are interconnected by means of a capacitor 5. This capacitor blocks the direct current which is applied to the wires a and b of the telephone line TL by the central battery 8 by means of the resistors 6 and 7.

Speech signals which are applied to the terminals 9 and 10 of the primary winding will pass the circuit substantially without being attenuated when the inductances of the windings and the capacitance of capacitor 5 are of a sufficiently high value.

The telephone line TL is symmetrically fed with direct current through the resistors 6 and 7. The symmetry depends on the degree of equality of the resistors 6 and 7.

With a sufficiently high value of capacitor 5 the symmetry of the alternating current signal transfer from the terminals 9 and 10 to the telephone line will depend on the degree of equality of the windings 3 and 4.

For signals having equal phases on the a-wire and the b-wire, the so-called equal phase or "common-mode" signals, the connecting circuit offers the parallel arrangement of the supply resistors 6 and 7.

SUMMARY OF THE INVENTION

It is an object of the invention to provide a connecting circuit having the same advantageous properties as the conventional connecting circuit, but implemented electronically and, in particular, a circuit for the symmetrical transfer of signals to the telephone line.

The arrangement according to the invention is characterized in that the signal is superimposed on a direct current which is applied to the reference voltage circuit of a bidirectional current source which is connected to the two wires of the telephone line and which applies, from high internal resistances, equal but oppositely directed currents which are proportional to the current in the reference circuit to the wires of the telephone line.

This connecting circuit has the advantage that the symmetry in the signal transmission depends only on the symmetry of the d.c. voltage source. When the d.c. voltage source consists of the central battery and a couple of supply resistors, the symmetry will be determined by these resistors.

BRIEF DESCRIPTION OF THE FIGURES

FIG. 1 shows the circuit diagram of a prior art connecting circuit,

FIG. 2 shows the circuit diagram of an embodiment of an arrangement according to the invention, FIG. 3 shows the battery connection.

DESCRIPTION OF THE EMBODIMENT

As illustrated in FIG. 2, a d.c. voltage supply circuit 11 is connected, in the connecting circuit for a telephone line TL, to the wires a and b of the telephone line by means of a pair of mutually equal resistors 12 and 13.

The signal to be transferred to the telephone line is represented by a.c. voltage source 14, whose output voltage is superimposed on the output voltage of d.c. voltage source 15 and applied to the emitter of a transistor 17 via resistor 16. These voltages generate a current $I_1$ in the collector of transistor 17.

The current $I_1$ is applied to the reference voltage circuit 18 of a bidirectional current source which includes the reference voltage circuit 18 and an output circuit 19 and which will be denoted as current source 18–19.

The reference voltage circuit has an input 18-1 for the current $I_1$ and an output 18-2, which is connected to a negative supply voltage $-V_1$, to which the current $I_1$ is discharged. In addition, there is a pair of outputs 18-3 and 18-4 between which the current $I_1$ generates a reference voltage.

The output circuit 19 has an output 19-1 and an output 19-2 which carry equal but oppositely directed currents $I_2$ from high internal resistances, these currents being proportional to the current $I_1$ flowing in the reference voltage circuit.

The output 19-1 is connected to the a-wire of telephone line TL through diode 20 and output 19-2 is connected to the b-wire through the diode 21.

The current $I_2$ flowing through diodes 20 and 21 will split into a portion which flows through the telephone line and into a portion which flows through the resistors 12 and 13 and the d.c. voltage circuit.

Output circuit 19 has the inputs 19-3 and 19-4, to which the reference voltage of reference voltage circuit 18 is applied by way of the outputs 18-3 and 18-4.

The current source 18-19 includes a number of pairs of transistors 22, 23, 24 and 25, each pair being arranged in what is known as a Darlington configuration.

The pair of transistors 22 of the npn type forms a current mirror together with the pair of transistors 24 of the same type and, similarly, the pair of transistors 23 of the pnp type forms a current mirror together with the pair of transistors 25 of the same type. The pairs of transistors 22 and 23 form the voltage reference circuits for the pairs of transistors 24 and 25, which forms the output circuits of the current mirrors. Each current mirror forms a unidirectional current source, that is to say a source having a high impedance at one terminal (collector of the pair of transistors in the output circuit) and a low impedance at the other terminal (emitter of the pair of transistors in the output circuit). The operation of current mirrors is well-known.

It can be added here that owing to the fact that Darlington pairs are used, the current gain is sufficiently great that the currents which flow through the outputs 18-3 and 18-4 are negligibly small compared with the currents $I_1$ and $I_2$. This ensures that the current $I_2$ is accurately proportional to the current $I_1$.

The currents $I_1$ and $I_2$ can be equal, in which case equal pairs of transistors must be used. The function of the equal resistors 26 and 27 in the emitter circuits is to reduce the effects of small mutual differences between the transistors. By a suitable choice of the ratio of the emitter areas of the pairs of transistors in the output circuit 19 to those in the reference voltage circuit 18 other, desired, ratios of the currents $I_2$ and $I_1$ can be realized. The resistors 26 and 27 must then have the inverted ratio to the currents which must flow through them.

For the moment in order to simplify the description, it will be assured that the d.c. voltage circuit 11 consists of a battery which is arranged between the output terminals 11-1 and 11-2. The positive pole is connected to terminal 11-1 and the negative pole to terminal 11-2 as illustrated in FIG. 3. This polarity corresponds to the direction of conduction of the current source 18-19.

To enable a symmetrical energization of the telephone line TL by the current $I_2$ it is necessary for the resistors 12 and 13 to be accurately equal to each other.

The distribution of current $I_2$ over the telephone line TL and the resistors 12 and 13 will be determined by the impedance of the telephone line and the values of the resistors 12 and 13.

Assuming each of the resistors 12 and 13 to be equal to half the impedance of the telephone line, one half of the current $I_2$ will then flow through the telephone line and the other half through the resistors 12 and 13. This produces an attenuation of 3 dB, which is normal when the telephone line is connected to a balanced hybrid circuit. In that case half the signal energy is lost in the balance impedance.

On the above assumption, the d.c. voltage of the telephone line will be equal to half the battery voltage and the other half of the battery voltage will be present across the resistors 12 and 13. Assuming a battery voltage of 60 Volts, the positive pole being connected to ground, and a quiescent current setting of 10 mA for $I_2$, then the a-wire will have a voltage of $-16.5$ V in the closedloop case and the b-wire a voltage of $-43.5$ Volts.

Let now the case be considered that common-mode signals are produced on the wires of the telephone line. As long as the potential of the a-wire remains above $-30$ Volts and the potential of the b-wire below $-30$ Volts, the operation of the current source 18-19 will not be affected, provided the voltage $-V_1$ is equal to half the battery voltage, i.e. $-V_1 = -30$ Volts.

To enlarge the permissible range of common-mode signals it is advantageous to decouple output 18-3 of the voltage reference circuit from the voltage $-V_1$ and to couple it to the mean voltage of the a-wire and the b-wire. For this purpose the connection c within the block 28 is replaced by the connection d, so that output 18-3 is connected to the point 29 which is connected to the a-wire and b-wire through equal high-resistance resistors 30 and 31. The voltage $-V_1$ of the output 18-2 can now be chosen to be equal to the battery voltage, i.e. $-V_1 = -60$ Volts. The voltage swing (peak-to-peak value) of the common-mode signals may then be equal to the battery voltage.

The permissible range of common-mode signals can be enlarged in a simple manner by connecting the base of transistor 17 to a positive potential and the output 18-2 to a potential which is more negative than the negative battery voltage.

The semiconductor diodes 20 and 21 protect the current source 18-19 from breakdown to the voltage $-V_1$ when the battery voltage is inverted.

Inversions of the battery voltage can be used as the ringing signal for the subscriber. In the periods of inverted polarity, current source 18-19 is kept in the switched-off state by diodes 20 and 21. In the periods of normal polarity the current $I_2$ will reduce the voltage between the a-wire and the b-wire. During ringing the current source 18-19 can, however, be switched-off by cutting off transistor 17 by means of transistor 32 which can be controlled by input 33.

FIG. 2 shows an implementation of d.c. voltage supply circuit 11, used in combination with current source 18-19, which is more advantageous than the simple battery of FIG. 3. This implementation has been proposed in Applications' non-pre-published application No. (PHN.9065). It comprises an a.c. voltage source 34 which is connected to the primary winding 35 of a transformer 36. Controlled switches 38 and 39 are connected between the ends of the secondary winding 37 and a common point. A low-pass filter 41, which terminates at the output terminals 11-1 and 11-2 is connected to this common point and the centre tap of winding 37. A capacitor 42 is arranged between these terminals, provided it has not already been included in the filter for providing a low-resistance alternating current path between the output terminals.

The switches 38 and 39 are controlled by a control signal generator 40 which also synchronizes the a.c. voltage source 34. When the switch 38 is closed, when the voltage at the corresponding end of winding 37 is positive and switch 39 is closed, when the voltage at the end of winding 37 corresponding therewith is positive, that is to say in the next half cycle of a.c. voltage source 34, a d.c. voltage will be produced between the terminals 11-1 and 11-2, which is positive at terminal 11-1 and negative at terminal 11-2. A shift of half a cycle in the control of the switches 38 and 39 with respect to a.c. voltage source 34 will cause inversion of the polarity of the d.c. voltage between the terminals 11-1 and 11-2.

An impedance 43, which is arranged in series with the a.c. voltage source 34 provides an effective internal direct current resistance of the d.c. voltage supply circuit between the terminals 11-1 and 11-2. The total desired direct current resistance can then be realized partly by the resistors 12 and 13 and partly by means of the impedance 43. In this way it is possible to realize different terminating impedances for alternating current and direct current in a simple manner.

What is claimed is:

1. An arrangement for transferring a signal to a two wire transmission line, such a telephone line, comprising a source of d.c. voltage connected between said two wires for symmetrically feeding said line with a d.c. current, a bidirectional current source having a pair of high internal resistance output terminals each connected to a respective one of said two wires for supplying to each wire equal and oppositely directed currents, a circuit for supplying a reference voltage to said bidirectional current source, and means for superimposing said signal on a direct current and for applying said signal superimposed on said direct current to said voltage reference circuit so that the currents supplied to each of said wires by said bidirectional current source are proportional to the current applied to said voltage reference circuit.

2. An arrangement according to claim 1 wherein said bidirectional current source is formed by a pair of unidirectional current sources each having a first terminal of high internal resistance connected to one wire of said line and defining a respective one of said output terminals, and a second terminal of low internal resistance, said second terminals of said unidirectional current sources being interconnected and the reference voltage circuits of said current sources being arranged in series.

3. The arrangement according to claim 2 including a voltage divider having a central tap, said voltage divider being connected between said wires of said line, and wherein said signal superimposing and applying means includes a transistor controlled by said signal and said series arrangement of said reference voltage circuits is connected between the collector of said transistor and said tap.

4. An arrangement according to claim 1 including an element which conducts in one direction arranged between each wire of said line and said bidirectional current source for protecting said bidirectional current source in the event of a change in polarity of said d.c. voltage source.

* * * * *